(12) United States Patent
Wu et al.

(10) Patent No.: US 11,782,324 B2
(45) Date of Patent: Oct. 10, 2023

(54) OPTICAL MEMBER DRIVING MECHANISM

(71) Applicant: TDK TAIWAN CORP., Taoyuan (TW)

(72) Inventors: Fu-Yuan Wu, Taoyuan (TW);
Shang-Yu Hsu, Taoyuan (TW);
Yu-Huai Liao, Taoyuan (TW);
Meng-Ting Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/945,507

(22) Filed: Sep. 15, 2022

(65) Prior Publication Data
US 2023/0018051 A1 Jan. 19, 2023

Related U.S. Application Data

(63) Continuation of application No. 16/743,543, filed on Jan. 15, 2020, now Pat. No. 11,480,849.
(Continued)

(30) Foreign Application Priority Data

Dec. 20, 2019 (EP) ..................................... 19218896

(51) Int. Cl.
*G03B 5/00* (2021.01)
*G02B 27/64* (2006.01)
(Continued)

(52) U.S. Cl.
CPC .............. *G03B 5/00* (2013.01); *G02B 7/021* (2013.01); *G02B 7/08* (2013.01); *G02B 7/09* (2013.01);
(Continued)

(58) Field of Classification Search
CPC .. H04N 5/2254; H04N 5/2257; H04N 5/2328; H04N 5/23283; H04N 5/23287; H04N 23/55; H04N 23/57; H04N 23/685; H04N 23/686; H04N 23/687; G03B 2205/00–0084; G03B 30/00; G02B 13/0065; G02B 13/007
See application file for complete search history.

(56) References Cited

U.S. PATENT DOCUMENTS

| 7,505,677 B2 | 3/2009 | Kim et al. |
| 2007/0025710 A1 | 2/2007 | Shin et al. |

(Continued)

*Primary Examiner* — Paul M Berardesca
(74) *Attorney, Agent, or Firm* — MUNCY, GEISSLER, OLDS & LOWE, P.C.

(57) ABSTRACT

An optical member driving mechanism is provided. The optical member driving mechanism includes a movable portion, a fixed portion, a driving assembly and a guiding assembly. The movable portion is configured to connect an optical member, and is movable relative to the fixed portion. The driving assembly is configured to drive the movable portion to move relative to the fixed portion. The guiding assembly is configured to limit the mode of movement for the movable portion relative to the fixed portion. The guiding assembly includes an intermediate element, the intermediate element contacts the fixed portion and is movable relative to the fixed portion. The guiding assembly further includes a first metallic element, the first metallic element includes metal and corresponds to the intermediate element.

17 Claims, 9 Drawing Sheets

Related U.S. Application Data (60) Provisional application No. 62/887,905, filed on Aug. 16, 2019.

(51) Int. Cl.

| | | |
|---|---|---|
| *G03B 13/36* | (2021.01) | |
| *H04N 23/54* | (2023.01) | |
| *H04N 23/55* | (2023.01) | |
| *H04N 23/57* | (2023.01) | |
| *H04N 23/68* | (2023.01) | |
| *G02B 9/62* | (2006.01) | |
| *G02B 7/09* | (2021.01) | |
| *G02B 13/00* | (2006.01) | |
| *G02B 7/08* | (2021.01) | |
| *G02B 7/02* | (2021.01) | |
| *G02B 7/10* | (2021.01) | |

(52) U.S. Cl.
CPC ............... *G02B 7/10* (2013.01); *G02B 9/62* (2013.01); *G02B 13/001* (2013.01); *G02B 13/0065* (2013.01); *G02B 27/646* (2013.01); *G03B 13/36* (2013.01); *H04N 23/54* (2023.01); *H04N 23/55* (2023.01); *H04N 23/57* (2023.01); *H04N 23/687* (2023.01); *G03B 2205/0007* (2013.01); *G03B 2205/0053* (2013.01); *G03B 2205/0069* (2013.01)

(56) References Cited

U.S. PATENT DOCUMENTS

| | | |
|---|---|---|
| 2011/0267692 A1 | 11/2011 | Watanabe et al. |
| 2017/0094183 A1 | 3/2017 | Miller et al. |
| 2017/0139225 A1 | 5/2017 | Lim |
| 2017/0235095 A1 | 8/2017 | Sekimoto et al. |
| 2019/0020822 A1 | 1/2019 | Sharma et al. |
| 2019/0068042 A1 | 2/2019 | Kimura et al. |
| 2019/0121103 A1 | 4/2019 | Bachar et al. |
| 2019/0294027 A1 | 9/2019 | Kim et al. |
| 2020/0409170 A1 | 12/2020 | Li et al. |
| 2020/0409171 A1 | 12/2020 | Xu et al. |
| 2021/0092264 A1* | 3/2021 | Kang .................. G03B 13/36 |
| 2021/0266433 A1* | 8/2021 | Chang ................. H04N 23/57 |

* cited by examiner

OPTICAL MEMBER DRIVING MECHANISM

CROSS REFERENCE TO RELATED APPLICATIONS

This application is a Continuation of pending U.S. patent application Ser. No. 16/743,543, filed Jan. 15, 2020 and entitled "OPTICAL member driving mechanism", which claims the benefit of U.S. Provisional Application No. 62/887,905, filed Aug. 16, 2019, and claims priority of European Patent Application No. 19218896.9, filed Dec. 20, 2019, the entirety of which are incorporated by reference herein.

BACKGROUND

Technical Field

The disclosure relates to an optical member driving mechanism, and in particular to an optical member driving mechanism including a guiding assembly that is configured to limit the mode of movement for the movable portion relative to the fixed portion.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choice.

Electronic devices with a camera or video function usually have a driving module disposed therein to drive an optical member to move along an optical axis. Therefore, an autofocus (AF) and/or optical image stabilization (OIS) function is achieved. Light may pass through the optical member and form an image on a photosensitive member.

However, the arrangement of the driving module may occupy a certain amount of space, limiting the design of the electronic device. Accordingly, the size of the electronic device is usually not sufficient to meet users' requirements. Therefore, how to solve the aforementioned problem has become an important topic.

BRIEF SUMMARY

The present disclosure provides an optical member driving mechanism. The optical member driving mechanism includes a movable portion, a fixed portion, a driving assembly and a guiding assembly. The movable portion is configured to connect an optical member, and is movable relative to the fixed portion. The driving assembly is configured to drive the movable portion to move relative to the fixed portion. The guiding assembly is configured to limit the mode of movement for the movable portion relative to the fixed portion. The guiding assembly includes an intermediate element, the intermediate element contacts the fixed portion and is movable relative to the fixed portion. The guiding assembly further includes a first metallic element, the first metallic element includes metal and corresponds to the intermediate element.

In an embodiment, the guiding assembly further includes a second metallic element, the second metallic element includes metal, and the intermediate element is sandwiched between the first metallic element and the second metallic element.

In an embodiment, the first metallic element is disposed in the fixed portion, the second metallic element is disposed in the movable portion.

In an embodiment, the intermediate element contacts the first metallic element and the second metallic element at the same time.

In an embodiment, the intermediate element contacts either the first metallic element or the second metallic element at a single time.

In an embodiment, the first metallic element includes a first recess and a second recess for containing the intermediate element.

In an embodiment, a cross-section of the first recess is different from a cross-section of the second recess.

In an embodiment, the cross-section of the first recess is V-shaped, and the cross-section of the second recess is U-shaped.

In an embodiment, a length of the first recess is different from a length of the second recess.

In an embodiment, the optical member driving mechanism further includes a magnetic permeable structure embedded in the fixed portion, and the first metallic element is disposed higher than the magnetic permeable structure and exposed from the fixed portion.

In an embodiment, the optical member driving mechanism further includes a circuit component disposed on the fixed portion, wherein the circuit component is located between the magnetic permeable structure and the first metallic element.

In an embodiment, the optical member driving mechanism further includes an electric component disposed on the circuit component.

In an embodiment, when viewed in a direction that is perpendicular to a direction of motion of the movable portion, the circuit component and the first metallic element do not overlap.

In an embodiment, the movable portion has a reflection surface, and the reflection surface is not parallel to a direction of motion of the movable portion.

In an embodiment, the optical member driving mechanism further includes an integrated circuit component disposed on the fixed portion for determining the position of the movable portion.

In an embodiment, the first metallic element disposed around the integrated circuit component.

In an embodiment, the first metallic element has a bending portion extending in a direction that is not parallel to a direction of motion of the movable portion.

In an embodiment, the bending portion extends from different sides of the first metallic element.

In an embodiment, the driving assembly includes a magnetic member disposed on the movable portion and a coil disposed on the fixed portion.

In an embodiment, the fixed portion includes a base that is located below the movable portion, the base has a plurality of holes on a top surface of the base, and when viewed in a direction that is perpendicular to the top surface of the base, the holes and the first metallic element do not overlap.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
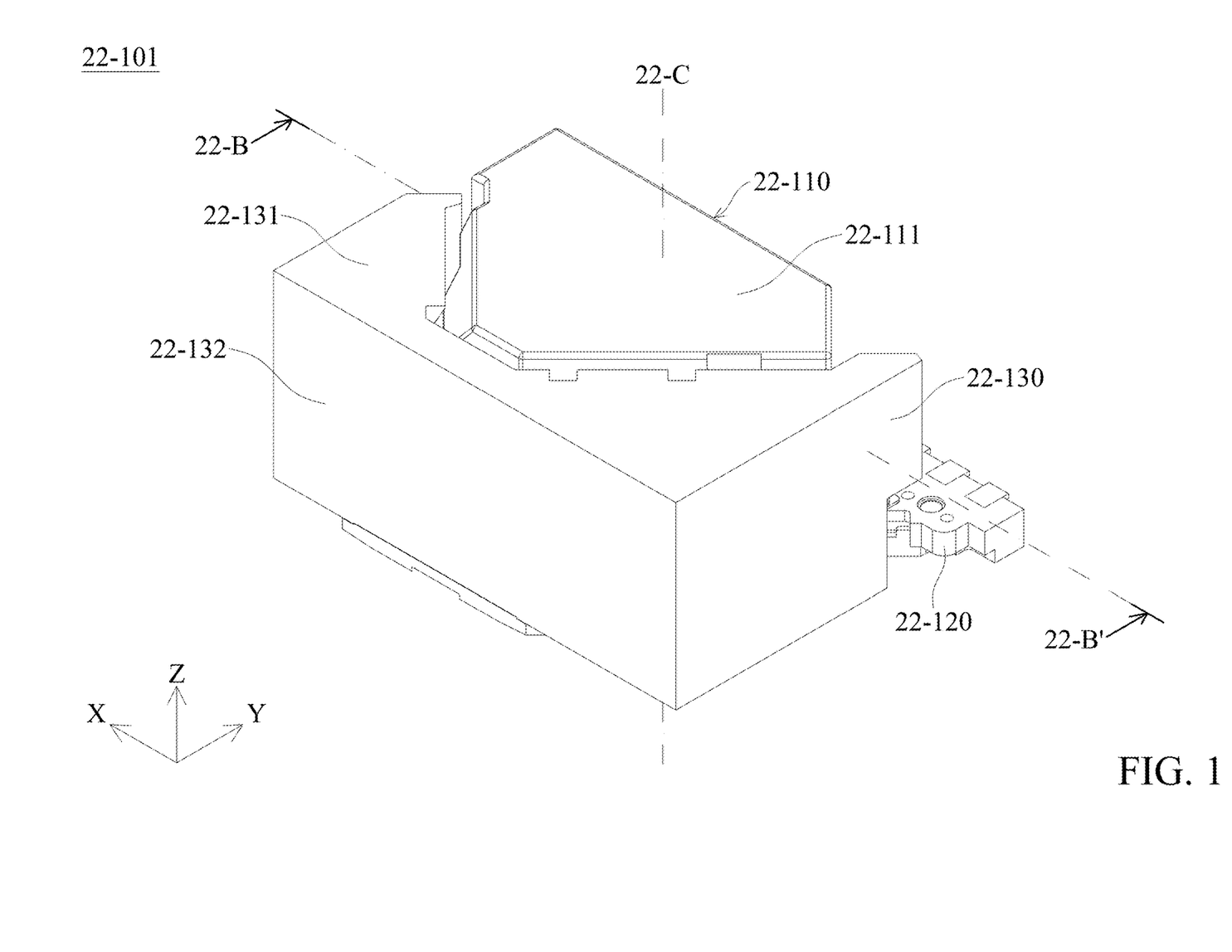
FIG. 1 is a perspective view illustrating an optical member driving mechanism in accordance with an embodiment of the present disclosure.

FIG. 1 is a schematic perspective view illustrating an optical member driving mechanism 22-101 in accordance with an embodiment of the present disclosure. It should be noted that, in this embodiment, the optical member driving mechanism 22-101 may be, for example, disposed in the electronic devices with camera function for driving an optical member (not shown), and can perform an autofocus (AF) and/or optical image stabilization (OIS) function.

As shown in FIG. 1, the optical member driving mechanism 22-101 has a main axis 22-C that is substantially parallel to the Z axis. The optical member driving mechanism 22-101 includes a housing 22-110 which has a top surface 22-111. The top surface 22-111 extends in a direction (i.e. the X-Y plane) that is parallel to the main axis 22-C. In addition, the optical member driving mechanism 22-101 includes a movable portion 22-130 that is movable relative to the housing 22-110. The movable portion 22-130 has a top surface 22-131, wherein the top surface 22-131 extends in a direction (i.e. the X-Y plane) that is parallel to the main axis 22-C. For example, the top surfaces 22-111 and 22-131 are located on the same horizontal plane, but the present disclosure is not limited thereto.

The movable portion 22-130 further has a reflection surface 22-132, wherein the reflection surface 22-132 is not parallel to the direction of motion of the movable portion 22-130. In the present embodiment, the reflection surface 22-132 is substantially perpendicular to the top surface 22-131, but the present disclosure is not limited thereto. In some other embodiments, the reflection surface 22-132 is not parallel to the top surface 22-131. In some embodiments, an optical element (not shown) may be disposed on the reflection surface 22-132, such that the light may be reflected after illuminating the above optical member. In other words, the optical member driving mechanism 22-101 may be configured to change the traveling direction of the light, and therefore perform an autofocus (AF) and/or optical image stabilization (OIS) function. In the present embodiment, when viewed in a direction (the Y axis) that is perpendicular to the reflection surface 22-132, the optical member may at least partially overlap the housing 22-110 or the movable portion 22-130. In addition, when viewed in a direction (e.g. the X axis, the Z axis) that is parallel to the reflection surface 22-132, the optical member does not overlap the housing 22-110 or the movable portion 22-130.

Figure 2:
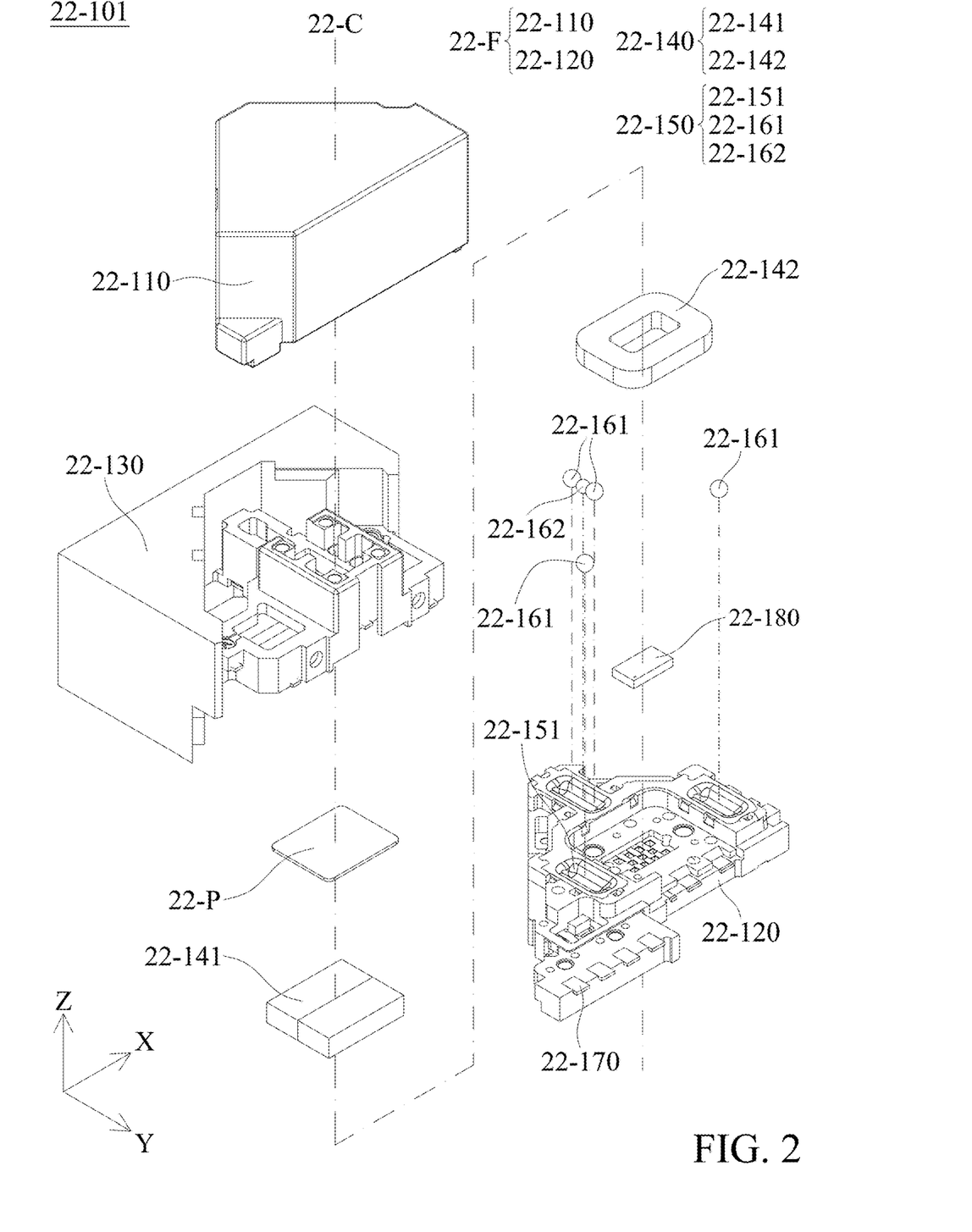
FIG. 2 is an exploded view illustrating the optical member driving mechanism shown in FIG. 1.

FIG. 2 is an exploded view illustrating the optical member driving mechanism 22-101 shown in FIG. 1. In the present embodiment, the optical member driving mechanism 22-101 has a substantial rectangular structure. The optical member driving mechanism 22-101 mainly includes a fixed portion 22-F, a movable portion 22-130, a driving assembly 22-140 and a guiding assembly 22-150. In the present embodiment, the fixed portion 22-F includes a housing 22-110 and a base 22-120.

The housing 22-110 is disposed on the base 22-120, and protect the elements disposed inside the optical member driving mechanism 22-101. In some embodiments, the housing 22-110 is made of metal or another material with sufficient hardness to provide good protection. The circuit component 22-170 is embedded in the base 22-120 for transmitting electric signals, such that the optical member driving mechanism 22-101 may control the position of the optical member disposed on the movable portion 22-130 according to the aforementioned electric signals. In the present embodiment, the circuit component 22-170 is disposed in the base 22-120 by insert molding, and thereby the required space for the optical member driving mechanism 22-101 may be reduced.

The movable portion 22-130 is movable relative to the fixed portion 22-F and is configured to carry an optical member. As shown in FIG. 2, the movable portion 22-130 is movably connected to the housing 22-110 and the base 22-120. The driving assembly 22-140 includes a magnetic member 22-141 and a coil 22-142. The magnetic member 22-141 is disposed on the movable portion 22-130, and the corresponding coil 22-142 is disposed on the base 22-120. When current is applied to the coil 22-142, an electromagnetic driving force may be generated by the coil 22-142 and the magnetic member 22-141 (i.e. the driving assembly 22-140) to drive the movable portion 22-130 and the optical member carried thereon to move along a horizontal direction (the Y axis) relative to the base 22-120, and therefore performing the autofocus (AF) and/or optical image stabilization (OIS) function. Furthermore, a magnetic permeable plate 22-P is disposed on the magnetic member 22-141 for concentrating the magnetic field of the magnetic member 22-141 so that the efficiency of the driving assembly 22-140 may be improved. For example, the magnetic permeable plate 22-P may be made of metal or another material with sufficient magnetic permeability.

In the present embodiment, an integrated circuit component 22-180 is disposed on the base 22-120. For example, the integrated circuit component 22-180 may detect the change of the magnetic field of the magnetic member 22-141, and the position of the movable portion 22-130 (and the optical member carried thereon) may be determined by the integrated circuit component 22-180. In some embodiments, the integrated circuit component 22-180 or the magnetic member 22-141 is disposed on the fixed portion 22-F, and the other of the integrated circuit component 22-180 or the magnetic member 22-141 is disposed on the movable portion 22-130.

In the present embodiment, the guiding assembly 22-150 includes a first track 22-151, a first rolling member 22-161 and a second rolling member 22-162. The first track 22-151 is disposed on and exposed from the base 22-120. In some embodiments, the first track 22-151 is disposed in the base 22-120 by insert molding. The first track 22-151 may include metallic material, and thereby the durability of the first track 22-151 may be enhanced. The size of the first rolling member 22-161 is different from the size of the second rolling member 22-162, and the first rolling member 22-161 and the second rolling member 22-162 are disposed on the first track 22-151 correspondingly. By means of the arrangement of the guiding assembly 22-150, the movable portion 22-130 is supported on the base 22-120, and the mode of movement for the movable portion 22-130 relative to the fixed portion 22-F may be limited. In the present embodiment, the movable portion 22-130 moves along the first track 22-151 in a horizontal direction (the Y axis).

Figure 3:
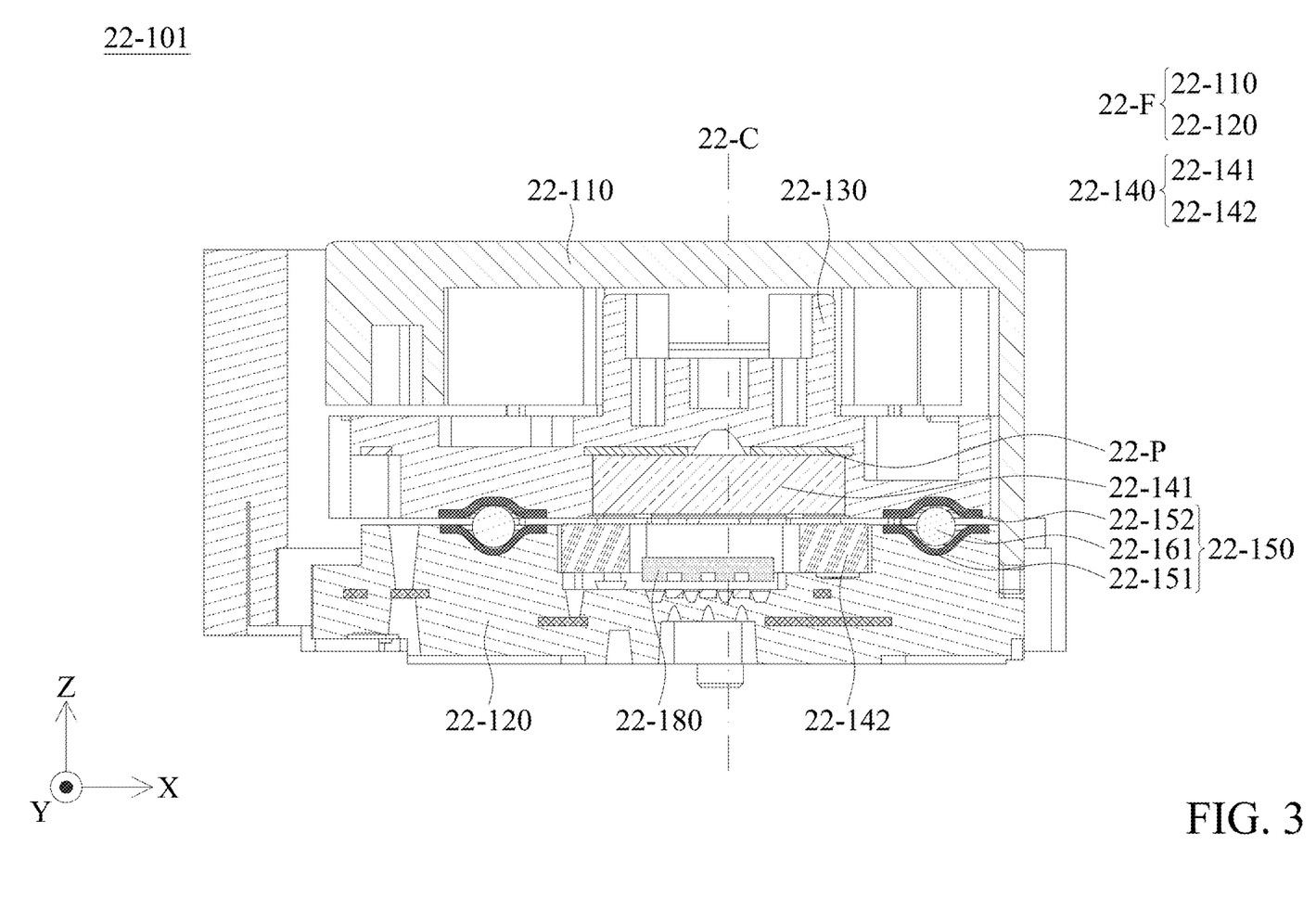
FIG. 3 is a cross-sectional view illustrating along line 22-B shown in FIG. 1.

FIG. 3 is a cross-sectional view illustrating along line B-B shown in FIG. 1. As shown in FIG. 3, the guiding assembly 22-150 further includes a second track 22-152 that is disposed on the movable portion 22-130 and corresponds to the first track 22-151. In other words, when viewed in a direction that is parallel to the main axis 22-C, the first track 22-151 and the second track 22-152 at least partially overlap. Similarly, the second track 22-152 may include metallic material, and thereby the durability of the second track 22-152 may be enhanced. In some embodiments, the first track 22-151 and the second track 22-152 completely overlap. The first rolling member 22-161 is disposed between the first track 22-151 and the second track 22-152, and abuts the first track 22-151 and the second track 22-152 at the same time. In some embodiments, a lubricant (not shown) is disposed on the first track 22-151 and/or the second track 22-152. As a result, the lubricant may be located between the first rolling member 22-161 and the first track 22-151, the second track 22-152, making the movement of the first rolling member 22-161 smoother. In some embodiments, the first track 22-151 may be parallel to the second track 22-152.

Figure 4:
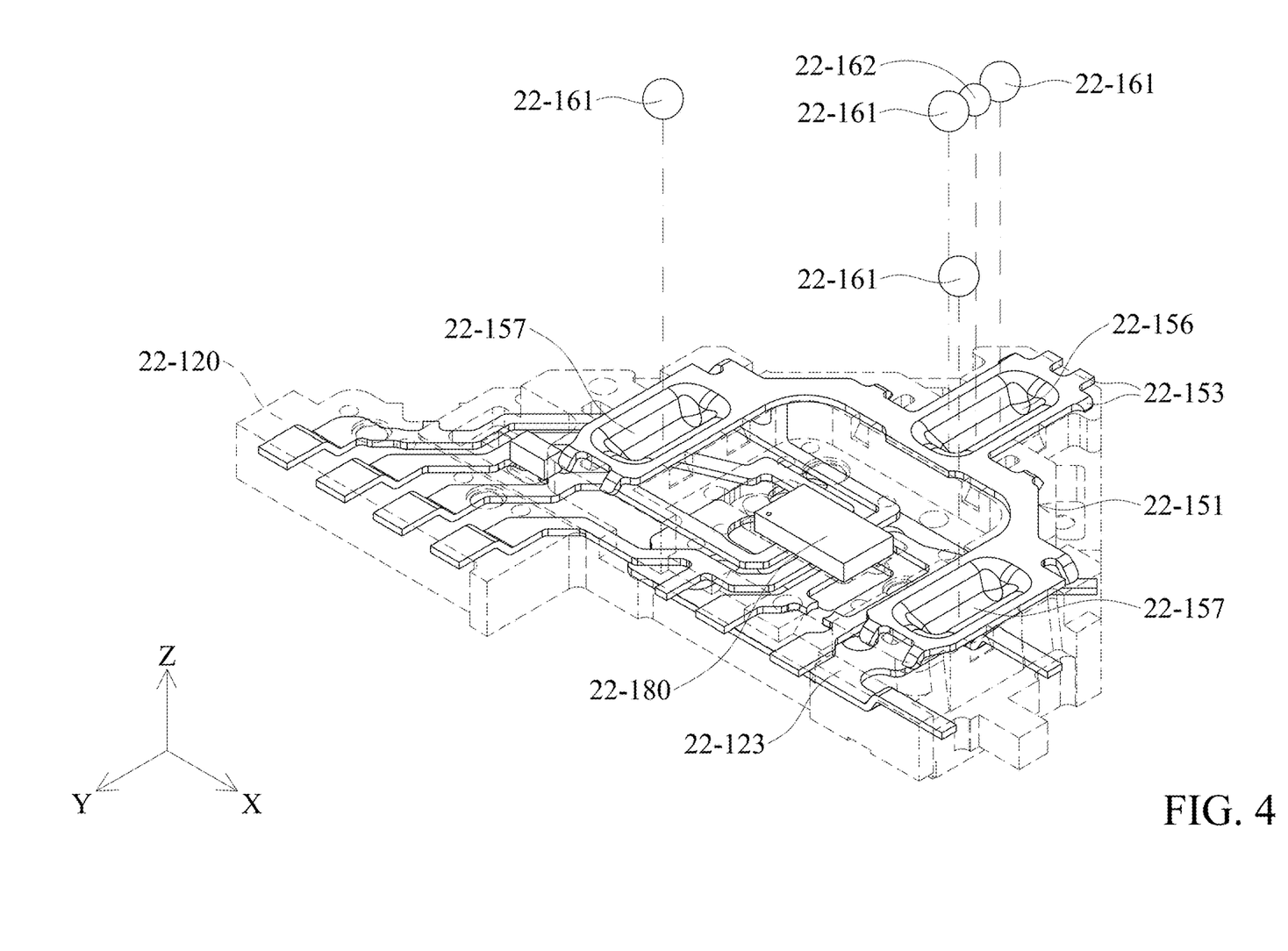
FIG. 4 is a perspective view illustrating a base and a guiding assembly in accordance with an embodiment of the present disclosure.

FIG. 4 is a perspective view illustrating the base 22-120 and the guiding assembly 22-150 in accordance with an embodiment of the present disclosure. As shown in FIG. 4, the base 22-120 further includes a magnetic permeable structure 22-123 that is embedded in the base 22-120. A magnetic attraction force may be generated by the magnetic permeable structure 22-123 and the magnetic member 22-141, and therefore helping to arrange the movable portion 22-130 on the base 22-120. In addition, the magnetic permeable structure 22-123, the circuit component 22-170 and the first track 22-151 are located at different heights in the base 22-120, respectively. It should be appreciated that the "height" discussed in the present disclosure means different positions in the Z axis. In the present embodiment, the circuit component 22-170 is located between the magnetic permeable structure 22-123 and the first track 22-151, but the present disclosure is not limited thereto.

The first track 22-151 has at least one bending portion 22-153 that extends in a direction that is not parallel to the extending direction (the Y axis) of the first track 22-151. The bending portion 22-153 may extend towards the interior of the base 22-120, and therefore helping to stably arrange the first track 22-151 on the base 22-120. The first track 22-151 further includes a first recess 22-156 and second recesses 22-157, wherein either the first recess 22-156 or the second recesses 22-157 are disposed on three sides of the base 22-120. In the present embodiment, the first recess 22-156 and the second recesses 22-157 are disposed on different sides of the base 22-120, and the first recess 22-156 is located between two second recesses 22-157. The length of the first recess 22-156 in the Y axis is longer than the length of the second recesses 22-157 in the Y axis. In some embodiments, the cross-section of the first recess 22-156 is V-shaped, and the cross-section of the second recesses 22-157 is U-shaped. By means of the above design, the difficult for arranging the first rolling member 22-161 and/or the second rolling member 22-162 may be reduced, and the tolerance may be dealt with in time.

In the present embodiment, the first rolling members 22-161 and the second rolling member 22-162 are disposed in the first recess 22-156. The second rolling member 22-162 is adjacent to the first rolling members 22-161 (such as located between two first rolling members 22-161). The arrangement of the first rolling members 22-161 and the second rolling member 22-162 may have a positive effect to the rolling of the first rolling members 22-161 and the second rolling member 22-162. In addition, single first rolling member 22-161 is disposed in the second recess 22-157.

Figure 5:
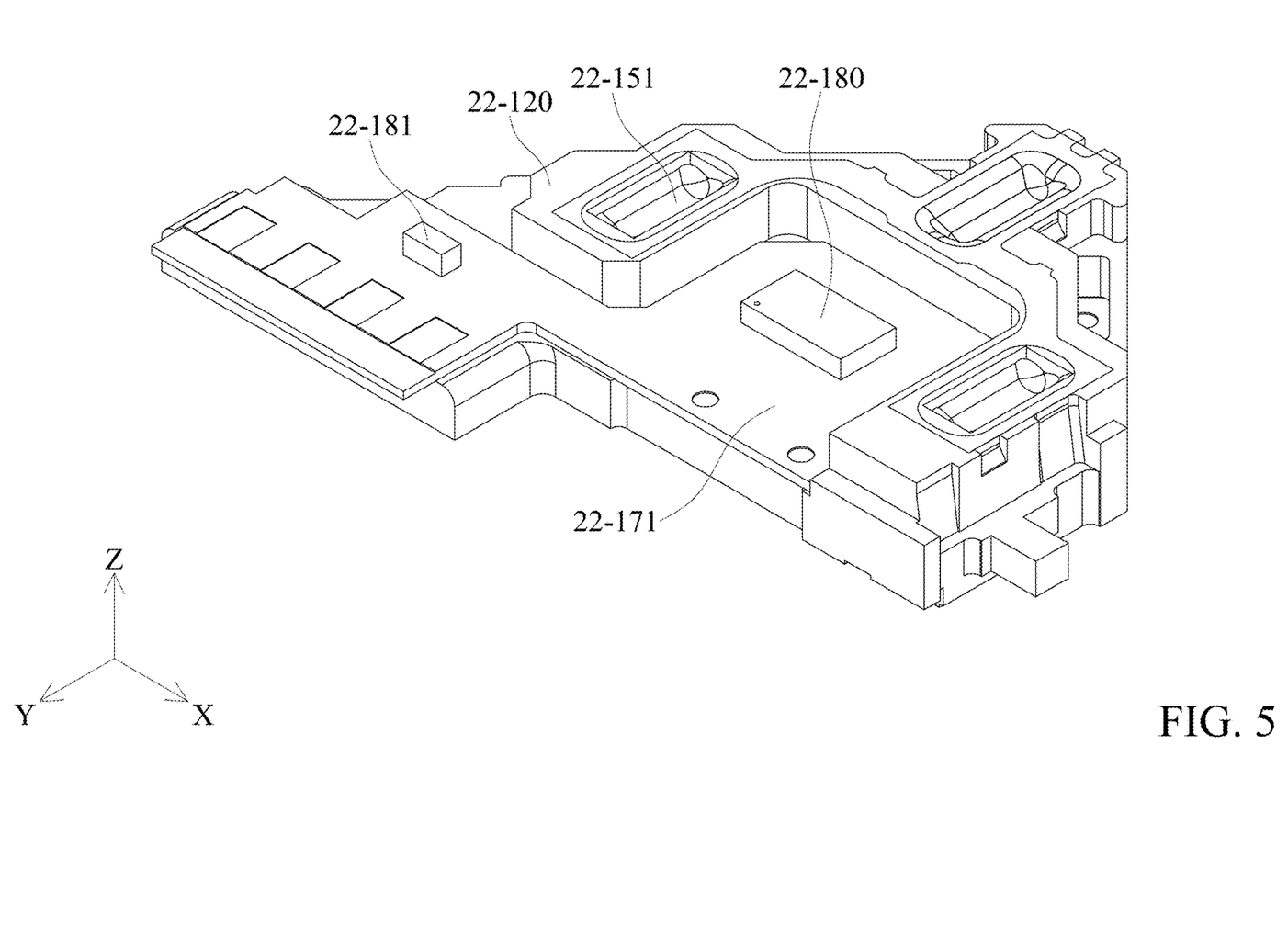
FIG. 5 is a perspective view illustrating the base and a circuit component in accordance with an embodiment of the present disclosure.

FIG. 5 is a perspective view illustrating the base 22-120 and the circuit component 22-171 in accordance with an embodiment of the present disclosure. As shown in FIG. 5, the circuit component 22-171 is disposed on the base 22-120. For example, circuit component 22-171 may be a printed circuit board (PCB), a flexible printed circuit board (FPC) or any other suitable circuit component. The circuit component 22-171 may be electrically connected to the integrated circuit component 22-180, and therefore transmitting electric signals. In addition, an electric component 22-181 is disposed on the circuit component 22-171. For example, the electric component 22-181 may be a capacitor, a resistor, an inductor or any other suitable electric component. In the present embodiment, when viewed in a direction (the Z axis) that is perpendicular to the direction of motion of the movable portion 22-130, the circuit component 22-171 and the first track 22-151 do not overlap.

Figure 6:
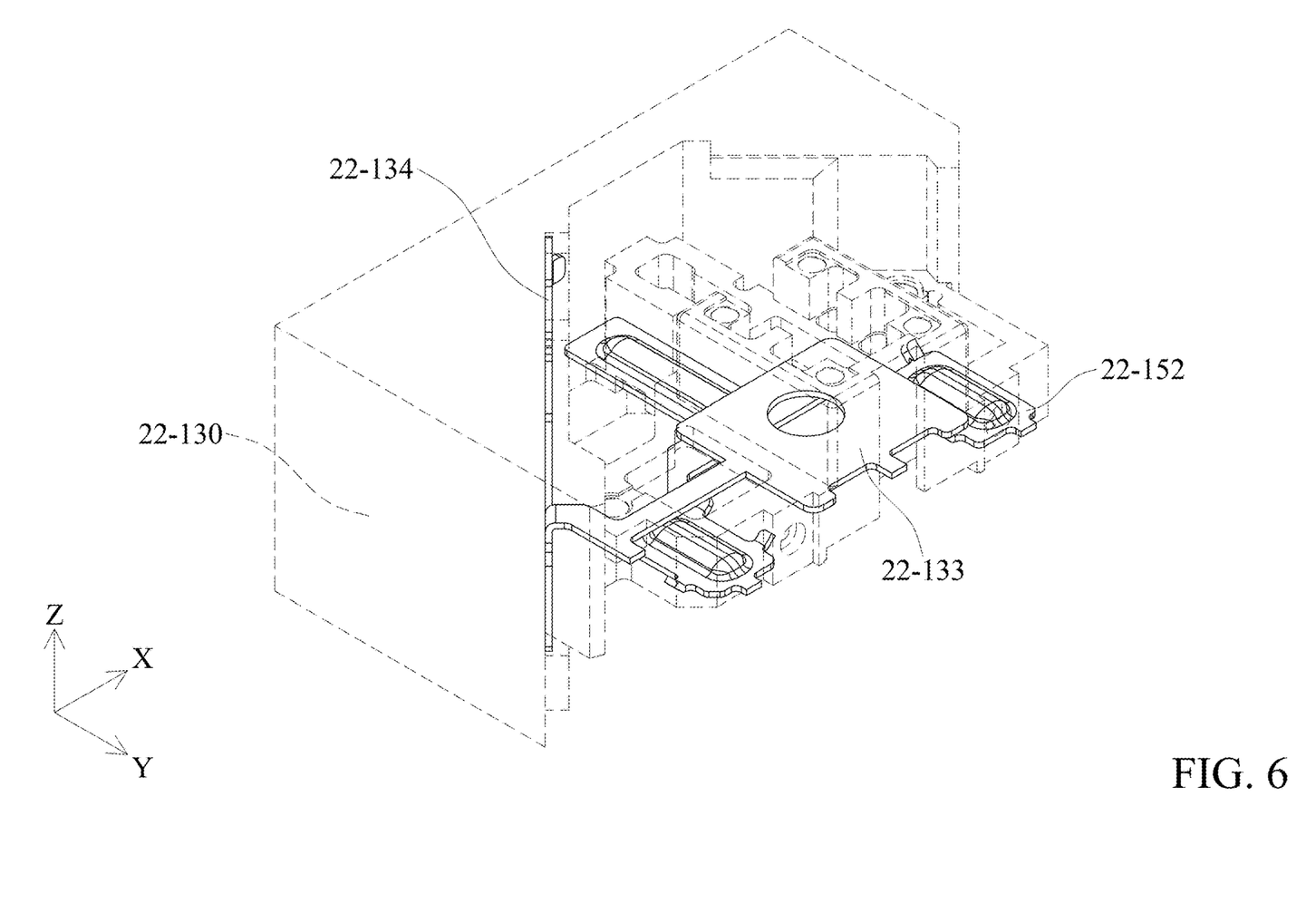
FIG. 6 is a perspective view illustrating a movable portion in accordance with an embodiment of the present disclosure.

FIG. 6 is a perspective view illustrating the movable portion 22-130 in accordance with an embodiment of the present disclosure. As shown in FIG. 6, a metallic member 22-133 is embedded in the movable portion 22-130, wherein the metallic member 22-133 and the second track 22-152 are disposed at different heights. In some embodiments, the metallic member 22-133 has a material with a certain magnetic permeability, such that a magnetic attraction force may be generated by the metallic member 22-133 and the magnetic member 22-141, and therefore helping to arrange the magnetic member 22-141 at a correct position. The metallic member 22-133 further includes an extending portion 22-134, which extends along a direction (the Z axis) that is not parallel to the direction of motion of the movable portion 22-130. By means of the arrangement of the extending portion 22-134, the structural strength of the movable portion 22-130 may be enhanced.

Figure 7:
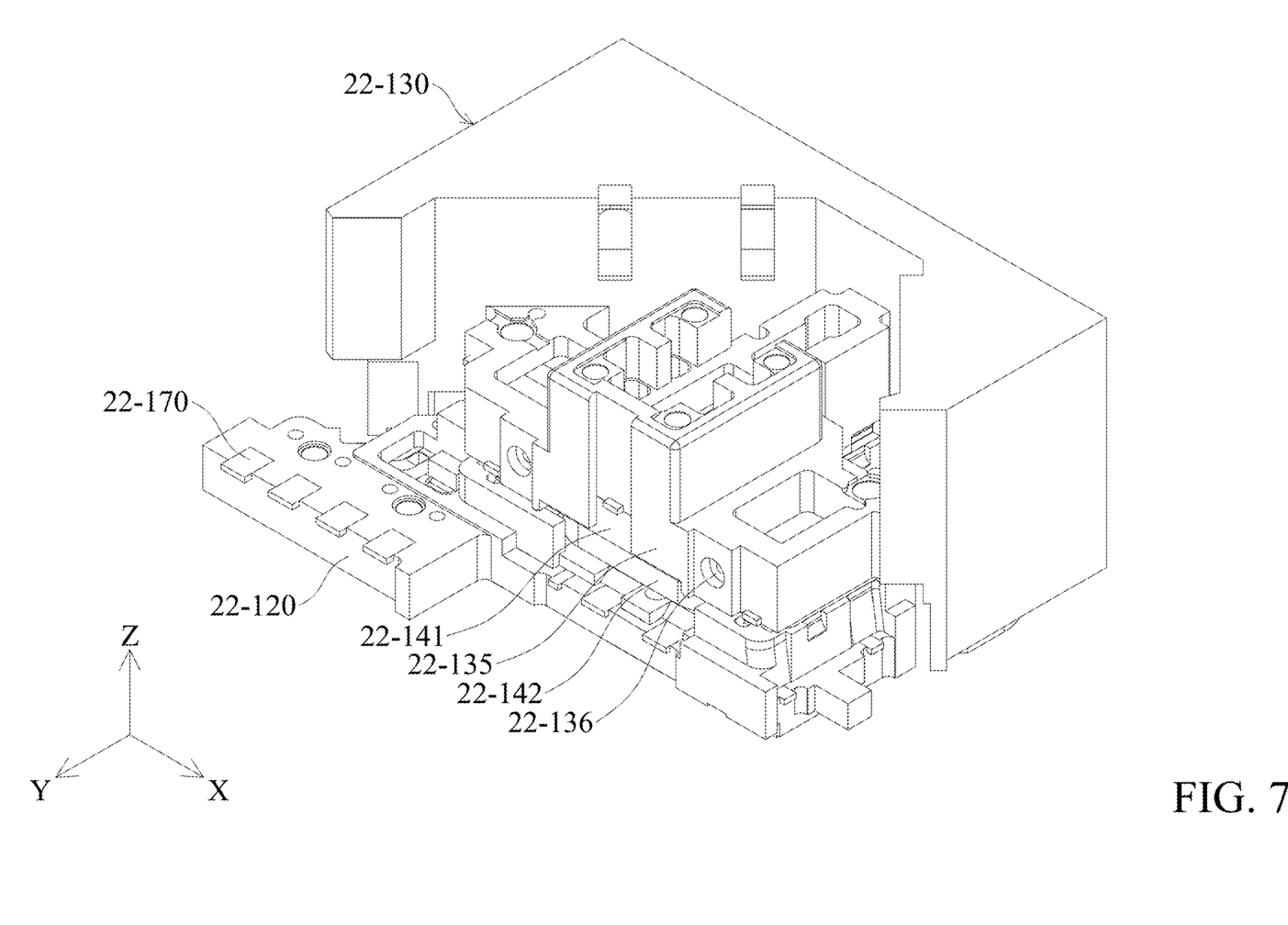
FIG. 7 is a perspective view illustrating the interior structure of the optical member driving mechanism in accordance with an embodiment of the present disclosure.

FIG. 7 is a perspective view illustrating the interior structure of the optical member driving mechanism 22-101 in accordance with an embodiment of the present disclosure. It should be appreciated that in order to clearly show the interior structure of the optical member driving mechanism 22-101, the housing 22-110 is not illustrated in the present embodiment. As shown in FIG. 7, the movable portion 22-130 further includes a stopping structure 22-135 that extends towards the housing 22-110. By means of the arrangement of the stopping structure 22-135, the position of the movable portion 22-130 may be located. In addition, the movable portion 22-130 has containing spaces 22-136 that are adjacent to the stopping structure 22-135. In the present embodiment, the stopping structure 22-135 is located between two containing spaces 22-136. A damping material (not shown) may be disposed in the containing spaces 22-136, and therefore the damping material is located between the movable portion 22-130 and the housing 22-110. In some embodiments, the shortest distance between the damping material and the housing 22-110 is not longer than the shortest distance between the stopping structure 22-135 and the housing 22-110. The arrangement of the damping material may help to reduce the impact between the movable portion 22-130 and the housing 22-110. For example, the damping material may include gel or any other material with certain flexibility.

Figure 8:
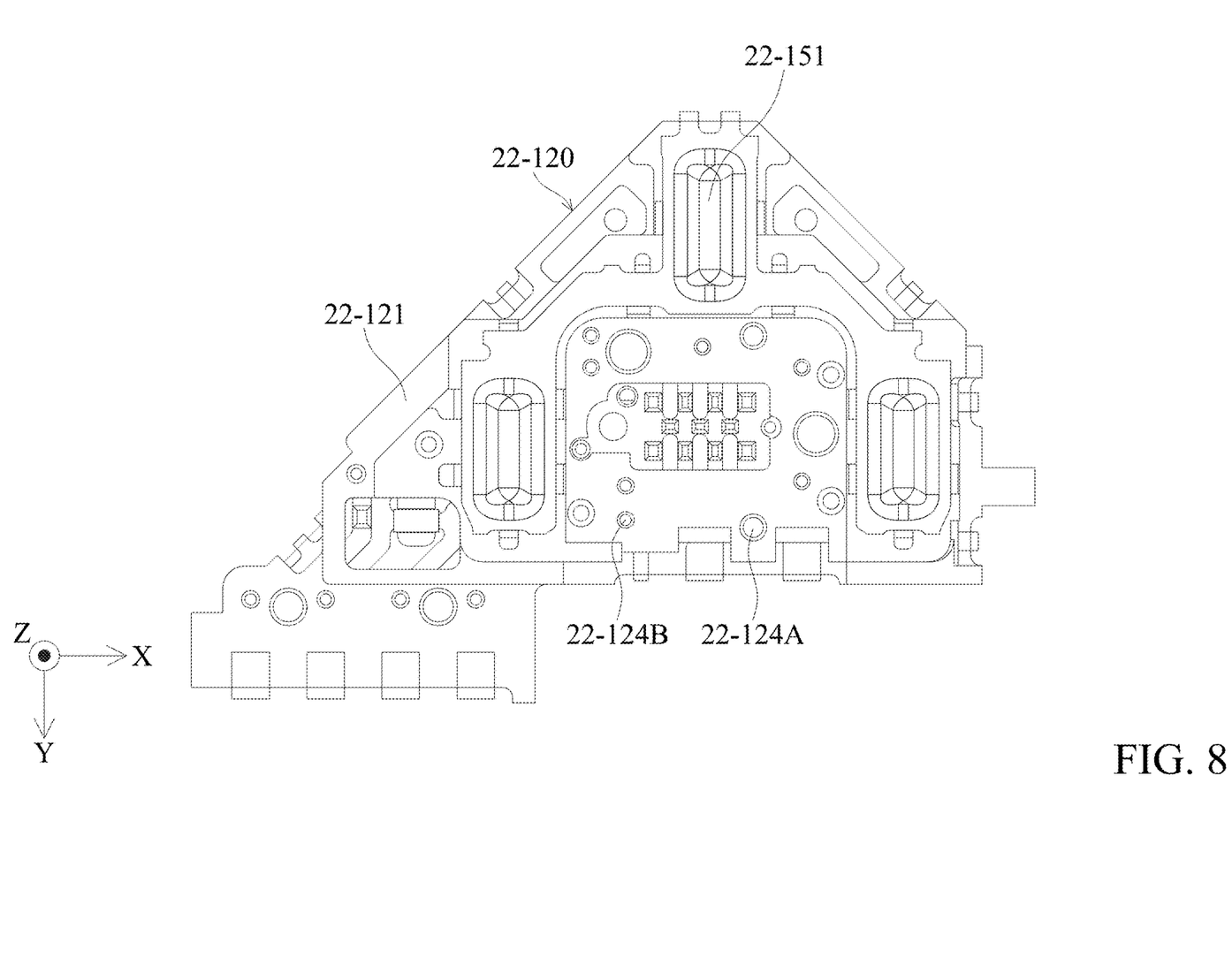
FIG. 8 is a top view illustrating the base in accordance with an embodiment of the present disclosure.

FIG. 8 is a top view illustrating the base 22-120 in accordance with an embodiment of the present disclosure. As shown in FIG. 8, the base 22-120 has a top surface 22-121 that faces the movable portion 22-130. A plurality of holes 22-124A, 22-124B are formed on the top surface 22-121, wherein the size of the holes 22-124A is different from the size of the holes 22-124B. The arrangement of the holes 22-124A and 22-124B may help for the thermal-dissipation of the optical member driving mechanism 22-101.

Figure 9:
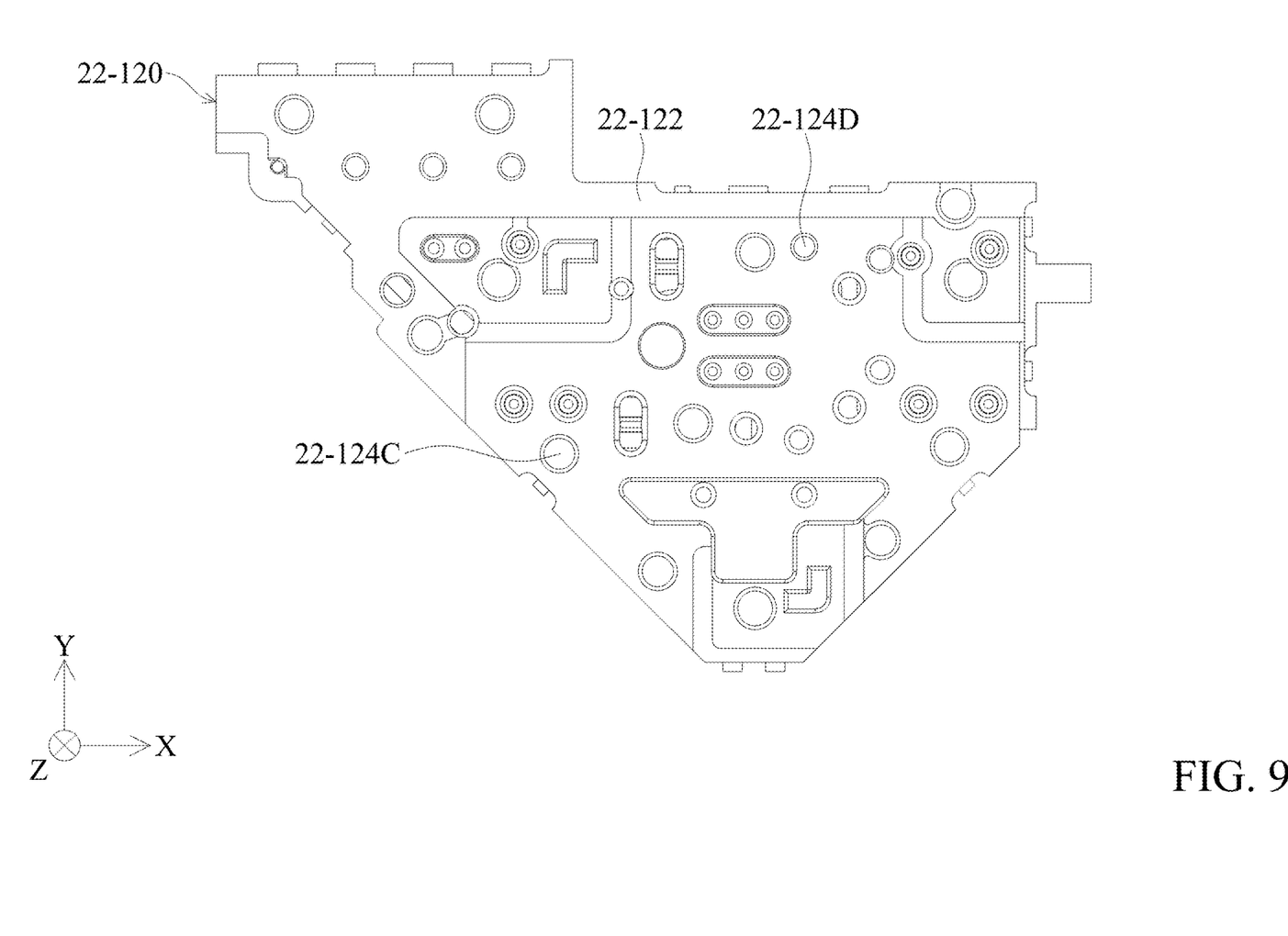
FIG. 9 is a bottom view illustrating the base in accordance with an embodiment of the present disclosure.

FIG. 9 is a bottom view illustrating the base 22-120 in accordance with an embodiment of the present disclosure. As shown in FIG. 9, the base 22-120 has a bottom surface 22-122 that is opposite to the top surface 22-121. A plurality of holes 22-124C, 22-124D are formed on the bottom surface 22-122, wherein the size of the holes 22-124C is different from the size of the holes 22-124D. Similarly, the arrangement of the holes 22-124C and 22-124D may also help for the thermal-dissipation of the optical member driving mechanism 22-101. In addition, in some embodiments, the holes 22-124A, 22-124B located on the top surface 22-121 do not communicate with the holes 22-124C, 22-124D located on the bottom surface 22-122. In some embodiments, when viewed in the extending direction (the Z axis) of the above holes, holes 22-124A, 22-124B do not overlap holes 22-124C, 22-124D.

As set forth above, the embodiments of the present disclosure provide an optical member driving mechanism including a guiding assembly that is configured to limit the mode of movement for the movable portion relative to the fixed portion. Since the guiding assembly includes metallic material, and therefore the structural strength and durability of the guiding assembly may be enhanced.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
a movable portion for connecting an optical member;
a fixed portion, wherein the movable portion is movable relative to the fixed portion;
a driving assembly for driving the movable portion to move relative to the fixed portion, the driving assembly comprising:
a magnetic member disposed on the movable portion; and
a coil disposed on the fixed portion; and
a guiding assembly configured to limit a mode of movement for the movable portion relative to the fixed portion, wherein the guiding assembly comprises an intermediate element, the intermediate element contacts the fixed portion and is movable relative to the fixed portion,
wherein the guiding assembly further comprises a first metallic element, the first metallic element comprises metal and corresponds to the intermediate element, and
wherein the first metallic element comprises a first recess and a second recess for containing the intermediate element, and a length of the first recess is different from a length of the second recess.

2. The optical member driving mechanism as claimed in claim 1, wherein the guiding assembly further comprises a second metallic element, the second metallic element comprises metal, and the intermediate element is sandwiched between the first metallic element and the second metallic element.

3. The optical member driving mechanism as claimed in claim 2, wherein the first metallic element is disposed in the fixed portion, the second metallic element is disposed in the movable portion.

4. The optical member driving mechanism as claimed in claim 2, wherein the intermediate element contacts the first metallic element and the second metallic element at the same time.

5. The optical member driving mechanism as claimed in claim 2, wherein the intermediate element contacts either the first metallic element or the second metallic element at a single time.

6. The optical member driving mechanism as claimed in claim 1, wherein a cross-section of the first recess is different from a cross-section of the second recess.

7. The optical member driving mechanism as claimed in claim 6, wherein the cross-section of the first recess is V-shaped, and the cross-section of the second recess is U-shaped.

8. The optical member driving mechanism as claimed in claim 1, further comprising a magnetic permeable structure embedded in the fixed portion, and the first metallic element is disposed higher than the magnetic permeable structure and exposed from the fixed portion.

9. The optical member driving mechanism as claimed in claim 8, further comprising a circuit component disposed on the fixed portion, wherein the circuit component is located between the magnetic permeable structure and the first metallic element.

10. The optical member driving mechanism as claimed in claim 9, further comprising an electric component disposed on the circuit component.

11. An optical member driving mechanism, comprising:
a movable portion for connecting an optical member;
a fixed portion, wherein the movable portion is movable relative to the fixed portion;
a driving assembly for driving the movable portion to move relative to the fixed portion, wherein the driving assembly comprises a magnetic member disposed on the movable portion and a coil disposed on the fixed portion;
a guiding assembly configured to limit a mode of movement for the movable portion relative to the fixed portion, wherein the guiding assembly comprises an intermediate element, the intermediate element contacts the fixed portion and is movable relative to the fixed portion, wherein the guiding assembly further comprises a first metallic element, the first metallic element comprises metal and corresponds to the intermediate element;
a magnetic permeable structure embedded in the fixed portion, wherein the first metallic element is disposed higher than the magnetic permeable structure and exposed from the fixed portion; and
a circuit component disposed on the fixed portion, wherein the circuit component is located between the magnetic permeable structure and the first metallic element,
wherein when viewed in a direction that is perpendicular to a direction of motion of the movable portion, the circuit component and the first metallic element do not overlap.

12. The optical member driving mechanism as claimed in claim 1, wherein the movable portion has a reflection surface, and the reflection surface is not parallel to a direction of a motion of the movable portion.

13. The optical member driving mechanism as claimed in claim 1, further comprising an integrated circuit component disposed on the fixed portion for determining a position of the movable portion.

14. The optical member driving mechanism as claimed in claim 13, wherein the first metallic element disposed around the integrated circuit component.

15. The optical member driving mechanism as claimed in claim 1, wherein the first metallic element has a bending portion extending in a direction that is not parallel to a direction of motion of the movable portion.

16. The optical member driving mechanism as claimed in claim 15, wherein the bending portion extends from different sides of the first metallic element.

17. An optical member driving mechanism, comprising:
a movable portion for connecting an optical member;
a fixed portion, wherein the movable portion is movable relative to the fixed portion;
a driving assembly for driving the movable portion to move relative to the fixed portion, wherein the driving assembly comprises a magnetic member disposed on the movable portion and a coil disposed on the fixed portion; and
a guiding assembly configured to limit a mode of movement for the movable portion relative to the fixed portion, wherein the guiding assembly comprises an intermediate element, the intermediate element contacts the fixed portion and is movable relative to the fixed portion, wherein the guiding assembly further comprises a first metallic element, the first metallic element comprises metal and corresponds to the intermediate element,
wherein the fixed portion includes a base that is located below the movable portion, the base has a plurality of holes on a top surface of the base, and when viewed in a direction that is perpendicular to the top surface of the base, the holes and the first metallic element do not overlap.

* * * * *